United States Patent
Tench et al.

(10) Patent No.: US 6,721,080 B1
(45) Date of Patent: Apr. 13, 2004

(54) OPTIMUM SWITCHING OF A REVERSIBLE ELECTROCHEMICAL MIRROR DEVICE

(76) Inventors: D Morgan Tench, 1180 Corte Riviera, Camarillo, CA (US) 93010-7419; Petra V. Rowell, 265 Heavenly Valley Rd., Newbury Park, CA (US) 91320-4777

( * ) Notice: Subject to any disclaimer, the term of this patent is extended or adjusted under 35 U.S.C. 154(b) by 7 days.

(21) Appl. No.: 10/256,841
(22) Filed: Sep. 27, 2002
(51) Int. Cl.[7] ................................................. G02F 1/15
(52) U.S. Cl. ...................................... 359/265; 359/267
(58) Field of Search ................................. 359/265, 267, 359/266, 268, 269, 270, 271, 272, 273, 274, 275

(56) References Cited

U.S. PATENT DOCUMENTS

| | | | | |
|---|---|---|---|---|
| 5,274,493 A | * | 12/1993 | Couput et al. ............... | 359/275 |
| 6,301,039 B1 | * | 10/2001 | Tench .......................... | 359/267 |
| 6,552,843 B1 | * | 4/2003 | Tench et al. ................. | 359/321 |

* cited by examiner

*Primary Examiner*—Scott J. Sugarman
*Assistant Examiner*—Richard Hanig
(74) *Attorney, Agent, or Firm*—D. Morgan Tench

(57) ABSTRACT

Reversible electrochemical mirror (REM) devices typically comprise a conductive oxide mirror electrode that is substantially transparent to radiation of some wavelengths, a counter electrode that may also be substantially transparent, and an electrolyte that contains ions of an electrodepositable metal. A voltage applied between the two electrodes causes electrodeposition of a mirror deposit on the mirror electrode and dissolution of the mirror deposit on the counter electrode, and these processes are reversed when the polarity of the applied voltage is changed. Such REM devices provide precise control over the reflection and transmission of radiation and can be used for a variety of applications, including smart windows and automatically adjusting automotive mirrors. According to the present invention, REM mirror uniformity is improved with minimal sacrifice in switching speed by utilizing a lower drive voltage when the mirror electrode sheet resistance is high, and a higher drive voltage when sufficient mirror metal is present to appreciably reduce the sheet resistance. Faster switching without damage to the electrode or decomposition of the electrolyte is provided by adjusting the applied voltage by the resistive loss in the electrolyte. Optimum results are provided by adjusting the drive voltages for the mirror metal plating and erasure processes based on real-time measurements of cell current, mirror electrode sheet resistance and temperature. Such sheet resistance measurements can also be used to monitor and control the reflectance of the device.

28 Claims, 5 Drawing Sheets

OPTIMUM SWITCHING OF A REVERSIBLE ELECTROCHEMICAL MIRROR DEVICE

CROSS-REFERENCE TO RELATED APPLICATIONS

This application is related to U.S. Pat. Nos. 5,903,382; 5,923,456; 6,111,685; 6,166,847; 6,256,135; 6,301,039; and 6,400,491; and to U.S. patent application Ser. No. 10/066,210, filed Jan. 31, 2002, all of which are assigned to the assignee of the present application. The teaching of each of these patents and patent applications is incorporated herein by reference.

BACKGROUND OF THE INVENTION

This invention is concerned with devices, such as adjustable mirrors, smart windows and optical attenuators, for controlling the reflectance and/or transmission of electromagnetic radiation.

Sunlight transmitted through windows in buildings and transportation vehicles can generate heat (via the greenhouse effect) that creates an uncomfortable environment and increases air conditioning requirements and costs. Current approaches to providing "smart windows" with adjustable transmission for use in various sunlight conditions involve the use of light absorbing materials. Such approaches are only partially effective since the window itself is heated so that heat is transferred into the interior by convection. In addition, these devices, such as electrochromic devices, are relatively expensive and exhibit limited durability and cycle life. Certain liquid crystal-based window systems switch between transmissive and opaque/scattering states, but these systems require substantial voltages to maintain the transparent state. There is an important need for an inexpensive, durable, low-voltage smart window with variable reflectivity. Reflecting the light, rather than absorbing it, is the most efficient means for avoiding inside heating. Devices for effectively controlling transmission of light are also needed for a variety of other applications. For example, an effective means for controlling light transmission over a wide dynamic range is needed to permit use of inexpensive are lamps as light sources for projection displays.

Bright light from headlamps on following vehicles reflected in automobile rear and side view mirrors is annoying to drivers and creates a safety hazard by impairing driver vision. Currently available automatically dimming mirrors rely on electrochromic reactions to produce electrolyte species that absorb light that would otherwise be reflected from a static mirror. Such devices do not provide close control over the amount of reflected light, and are expensive to fabricate since a very constant inter-electrode spacing (i.e., cell gap) is required to provide uniform dimming. Image sharpness is also reduced for electrochromic mirror devices since the reflected light must pass through the electrolyte (twice). There is an important need for an inexpensive adjustable mirror device that provides close control of reflected light with minimal image distortion.

There have been attempts in the prior art to exploit reversible electrodeposition of a metal for light modulation, primarily for display applications [see for example, J. Mantell and S. Zaromb, J. Electrochem. Soc. 109, 992 (1962) and J. P. Ziegler and B. M. Howard., Solar Eng. Mater. Solar Cells 39, 317, (1995)]. In this work, metal, typically silver or bismuth, was reversibly electrodeposited onto a transparent working electrode, usually indium tin oxide (ITO), from a thin layer of electrolyte sandwiched between the working electrode and a counter electrode. Both water and organic liquids (e.g., dimethylsulfoxide or dimethylformamide) were employed as solvents. The deposits obtained on the transparent electrode presented a rough and black, gray, or sometimes colored appearance (typical of finely-divided metals) and were used to enhance light absorption by display elements. Pigments were often added to the electrolyte to provide a white background for improved contrast. An auxiliary counter electrode reaction (e.g., halide ion oxidation) was typically employed to provide a voltage threshold (which is needed for matrix addressing) and/or to avoid metal deposition on a transmissive counter electrode (which would offset the light modulation provided by metal deposition on the working electrode). Such auxiliary reactions introduced chemistry-related instabilities during long term operation and led to deposit self erasure on open circuit via chemical dissolution of the metal deposit. Nonetheless, the key drawback of reversible metal electrodeposition for display applications was the relatively slow response for attaining adequate light blocking.

A reversible electrochemical mirror (REM) device permitting efficient and precise control over the reflection/transmission of visible light and other electromagnetic radiation is described in U.S. Pat. Nos. 5,903,382, 5,923,456, 6,111,685 and 6,166,847 to Tench et al. In this device, an electrolyte containing ions of an electrodepositable metal is sandwiched between a mirror electrode and a counter electrode, at least one of which is substantially transparent to the radiation. A typical transparent mirror electrode is indium tin oxide (ITO) or fluorine doped tin oxide (FTO) deposited on a transparent glass (or plastic) pane which serves as the substrate. Application of a voltage causes the electrodepositable metal, e.g., silver, to be deposited as a mirror on the mirror electrode while an equal amount of the same metal is dissolved from the counter electrode. When the voltage polarity is switched, the overall process is reversed so that the electrodeposited mirror metal is at least partially dissolved from the mirror electrode. A thin surface modification layer of noble metal, e.g., 15–30 Å of platinum, on the transparent conductor is usually required to improve nucleation so that a mirror deposit is obtained. The thickness of the mirror metal layer present on the mirror electrode determines the reflectance of the device for radiation, which can be varied over a wide range.

The REM technology can be used to provide control of either light reflectance or transmission, or both. A transmissive REM device suitable for smart window applications utilizes a noble metal counter electrode that is locally distributed, as a grid for example, on a transparent substrate, e.g., glass or plastic, so that mirror metal deposited thereon does not appreciably increase the blockage of light. In this case, high light transmission is provided by a locally distributed counter electrode of relatively small cross-sectional area and the device reflectance/transmission is adjusted via the thickness of mirror metal on the mirror electrode. As described in U.S. Pat. No. 6,166,847 to Tench et al., such a transmissive counter electrode is not required for reflective REM devices used for adjustable mirror applications. An electrolytic solution, which provides the inherent stability, high deposit quality, complete deposit erasure, long cycle life, and reasonably fast switching needed for most practical applications, is described in U.S. Pat. No. 6,400,491, to Tench et al. This solution is typically comprised of 1.5 M AgI and 2.0 M LiBr in a gamma-butyrolactone (GBL) solvent, and may also contain highly dispersed silica (HDS) added to produce a gelled electrolyte and/or dispersed carbon added to blacken the electrolyte so as to reduce background light reflection.

A significant problem with both electrochromic and REM devices is that light modulation at constant applied voltage occurs more slowly toward the center of the device. This reduced modulation rate results because the voltage is decreased by the relatively high sheet resistance of the transparent conductor film, e.g., indium tin oxide, which is used for at least one of the electrodes. Such "irising" is most noticeable for low light modulation states and is unacceptable for many applications. The iris effect can be mitigated by utilizing lower switching currents, for which the Ohm's law (IR) voltage drop is less, but at the sacrifice of switching speed. Switching speed of electrochemical light modulation devices is also limited by the need to avoid excessive voltages at the electrode interfaces with the electrolyte, which can cause decomposition of the electrolyte or damage to the electrode surfaces. A means for uniformly switching REM devices at relatively fast rates would greatly increase their utility and provide an additional advantage compared to electrochromic devices.

SUMMARY OF THE INVENTION

The method of the present invention provides uniform switching at relatively fast rates for reversible electrochemical mirror (REM) devices, which are comprised of an electrolyte containing electrodepositable metal ions, e.g., silver ions, in contact with a mirror electrode and a counter electrode. The electrolyte may be a liquid or solid electrolytic solution, an ionic liquid electrolyte, or a solid electrolyte. A stiffening agent may be added to render a liquid electrolyte more viscous, semi-solid or solid. The mirror electrode is typically comprised of a very thin layer of noble metal (e.g., platinum) on a layer of a transparent conducting oxide (e.g., indium tin oxide) on a glass or plastic substrate. Generally, the counter electrode is a sheet or layer of the electrodepositable mirror metal for devices that are designed to control radiation reflection, and is a locally distributed electrode for devices that also transmit radiation. The device reflectance is determined by the thickness of the mirror metal layer on the mirror electrode, which can be adjusted by applying a voltage of the appropriate polarity to cause mirror metal electrodeposition or dissolution, while the reverse process occurs at the counter electrode. The present invention exploits the fact that the sheet resistance of the mirror electrode decreases as the thickness of the deposited mirror metal layer increases. This sheet resistance decrease is unique to REM devices and provides another significant advantage compared to normal electrochromic systems.

According to the method of the present invention, improved mirror uniformity with minimal sacrifice in switching speed is attained for REM devices by utilizing lower drive voltages when the sheet resistance of the mirror electrode is high, and increasing the drive voltage when the sheet resistance is reduced by an appreciable thickness of the mirror metal. Good mirror uniformity is provided since the resistive voltage drop along the mirror electrode surface is minimized by the lower currents when little or no mirror metal is present, and by the low sheet resistance when the mirror metal thickness is appreciable. The overall switching time can be short since the current, which is directly related to the switching rate, can be greatly increased for thick mirror metal deposits without inducing mirror nonuniformity. The improvement provided is greatest for reflective-type devices with continuous metal counter electrodes also having low sheet resistance. However, the invention is also useful for transmissive-type devices utilizing counter electrodes that are locally distributed or located outside the light path.

Large voltages that would otherwise decompose the electrolyte or damage the electrode surface can be applied to increase the switching rate when current is flowing. This is because the voltage drop associated with the resistance of the electrolyte does not appear as electrode potential across the electrode-electrolyte interface. Consequently, the drive voltage can be increased beyond a safe value for the electrode potential by the magnitude of the resistive voltage loss (IR drop) in the electrolyte without detrimental effect. Likewise, the drive voltage is decreased so as to limit the electrode potential to a safe value as the current decreases in the later stages of mirror erasure. Such IR-compensated device switching is another aspect of the present invention.

In a preferred approach, the REM device is automatically switched (via a computer) according to a drive voltage algorithm based on real-time measurements of the electrode sheet resistance, device switching current and temperature. A method for measuring the electrode sheet resistance, which also yields the device reflectance/transmission, is described in U.S. Pat. No. 6,301,039 to Tench. Typically, the computer memory contains data defining the device current as a function of voltage and temperature, as well as the mirror electrode sheet resistance as a function of temperature. This data can be in the form of equations (and appropriate constant parameters) since the voltage drop in the electrolyte is typically much larger than the potential drops at the electrodes so that the device current varies linearly with the applied voltage (to a good approximation). Since the reciprocal of the electrolyte resistance is typically linear with temperature, a simple equation can also be used to determine appropriate adjustments in the applied voltage to compensate for changes in the device temperature. As a key feature of the present invention, the device current, preferably for both plating and erasure, is limited so that the voltage drop along the electrode (current x sheet resistance) does not exceed a value chosen to provide the best compromise between mirror uniformity and switching speed.

A variety of alternative approaches within the scope of the present invention will be apparent to those skilled in the art. For example, the charge passed in electrodepositing mirror metal on the bare electrode provides a measure of the deposit thickness that could be used to provide feedback on the mirror electrode sheet resistance in real time. In principle, the electrode sheet resistance could be known at any given time via the thickness of the mirror metal deposit by utilizing a charge integration device and keeping track of all of the charge passed for metal electrodeposition and dissolution as the mirror state was cycled. However, as the mirror was subjected to multiple cycles in which complete erasure of the mirror metal did not occur, measurement imprecision and minor efficiency imbalances between the metal electrodeposition and dissolution reactions would introduce cumulative errors in the calculated thickness and associated reflectance. However, this approach could be used with devices for which the mirror deposit is fully erased on a frequent basis.

In another embodiment of the present invention, a drive voltage that varies with time is used and no sheet resistance feedback is needed. In this case, a relatively small negative voltage is applied to initiate mirror formation and the voltage is stepped or ramped to more negative values as the mirror metal is deposited and the electrode sheet resistance decreases. Likewise, a relatively large positive voltage is applied to initiate mirror erasure and the voltage is stepped or ramped to less positive values as the mirror metal deposit is dissolved and the mirror electrode sheet resistance increases. Excess applied voltage to compensate for the electrolyte IR drop could also be used in this case. This approach is most appropriate with devices for which the mirror is fully erased on each cycle, as is typically the case for smart windows.

Further features and advantages of the invention will be apparent to those skilled in the art from the following detailed description, taken together with the accompanying drawings.

DETAILED DESCRIPTION OF THE INVENTION

Throughout this document, a higher drive voltage means a more negative voltage, providing faster mirror metal plating, or a more positive voltage, providing faster mirror metal erasure.

Figure 1:
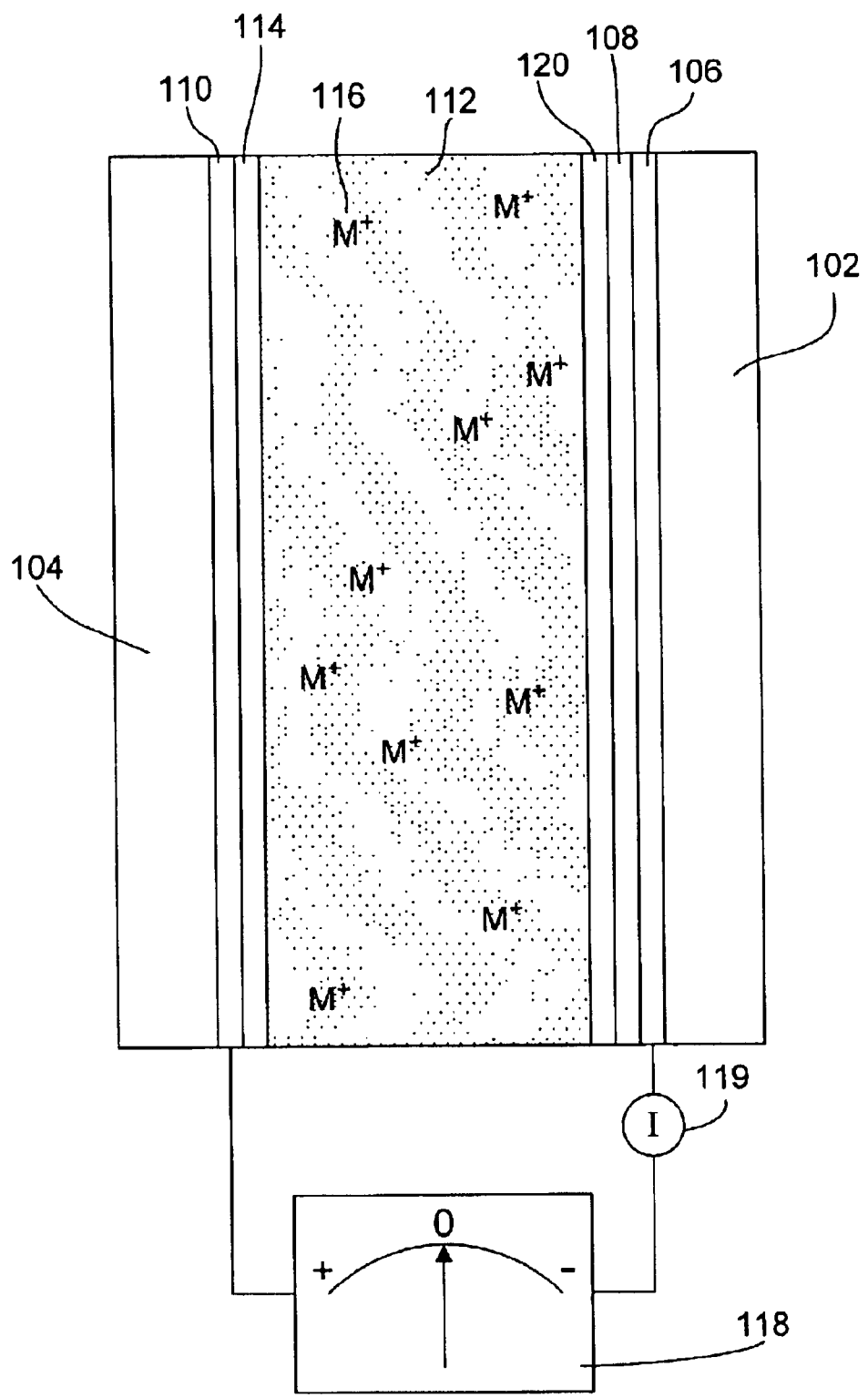
FIG. 1 is a cross sectional view depicting a representative design of a reversible electrochemical mirror (REM) device.

FIG. 1 is a cross sectional view depicting a representative design of a reversible electrochemical mirror (REM) to which the present invention pertains. Some dimensions, particularly layer thicknesses, are disproportionate in the drawings in order to more effectively illustrate the structure and function of the device. A REM device for modulation of reflected radiation is described in U.S. Pat. No. 6,166,847 to Tench et al. The REM device in the present example, which provides precise control over the reflection of electromagnetic radiation, includes a first substrate 102, which is substantially transparent to the portion of the spectrum of electromagnetic radiation to be controlled, and a second substrate 104. An electrically conducting film 106, which is also substantially transparent, is disposed on the first substrate. The film 106, with the optional addition of an electrochemically stable surface modification layer 108, functions as the mirror electrode. The surface modification layer 108 is typically a noble metal selected from the group consisting of platinum, iridium, gold, osmium, palladium, rhenium, rhodium and ruthenium. An underlayer of another metal (e.g., aluminum, chromium, hafnium, molybdenum, nickel, titanium, tungsten or zirconium) may be used to improve the adhesion of surface modification layer 108.

As also shown in FIG. 1, a second electrode 110 is disposed on the second substrate 104 and functions as the counter electrode. The counter electrode 10 can alternatively be a bulk electrode, a metal plate or sheet for example, with sufficient rigidity that the second substrate 104 would not be needed. For a device that also transmits radiation, electrode 110 may be a locally distributed electrode (not shown in FIG. 1), as described in U.S. Pat. Nos. 5,903,382 and 5,923,456 to Tench et al. The counter electrode 110 is electrochemically stable or is covered with a sufficient thickness of an active metal layer 114 to avoid exposure of the counter electrode surface to the electrolyte. It may also be protected from exposure to the electrolyte by a coating of electrochemically stable metal. Relatively stable metals that might be used as the counter electrode material or as a protective layer or coating on the counter electrode include Pt, Ir, Au, Os, Pd, Re, Rh, Ru, Cr, Ni, Ti and stainless steel. The surface of electrode 110 may be roughened to reduce reflection of radiation from the electrode or to improve switching speed by lowering the current density (via increased surface area). The REM cell may be initially charged with mirror metal prior to assembly by depositing the metallic layer 114 on the electrode 110, by depositing the layer 120 on the nucleation layer 108 or directly on electrode 106, or, as depicted in FIG. 1, by depositing partial mirror metal layers on each of the two electrodes.

An electrolyte 112, containing electrodepositable mirror metal ions 116, is located between and in electrical contact with the electrodes 106 and 110 (or layer 108 or, depending on the switched state of the device, layers 120 or 114). Metal ions 116, which contain the same metal atoms as the layers 114 and 120, can be reversibly electrodeposited on and electrodissolved from the mirror and counter electrodes. Surface modification layer 108 enhances nucleation for the metal electrodeposition process so that metal electrodeposited in layer 120 is continuous and fine-grained so as to exhibit high reflectivity for radiation.

The electrolyte 112, which contains electrodepositable metal ions and complexing agents, may contain a solvent or be a solventless ionic liquid electrolyte. A stiffening agent, highly dispersed silica (HDS) for example, may be added to render electrolyte 112 more viscous, semi-solid or solid. Electrolyte 112 may also contain one or more coloring agents to impart a desirable color to the electrolyte, or absorb light strongly over the wavelength region of interest to avoid reflection from the counter electrode in reflectance-type devices. For example, a black color can be imparted to electrolytic solutions via addition of a small amount of dispersed carbon black, which is typically used in conjunction with an electrolyte stiffener to prevent settling under the influence of gravity.

Preferred REM electrolytic solutions utilizing nonaqueous solvents are described in U.S. Pat. Nos. 5,903,382, 5,923,456, 6,111,685, and 6,400,491 to Tench et al. The solvent is preferably selected from the group consisting of gamma-butyrolactone (GBL), ethylene glycol (EG), dimethylsulfoxide (DMSO), dimethylformamide (DMF), and mixtures of these solvents. The electrodepositable metal is preferably selected from the group consisting of silver, bismuth, copper, tin, cadmium, mercury, indium, lead, antimony, thallium and zinc, and may be an alloy. The complexing anions are preferably selected from the groups consisting of halides (e.g., chloride, bromide and iodide) and pseudohalides (cyanide and thiocyanate), and are typically present in molar excess compared to the electrodepositable metal cations.

Ionic liquid electrolytes suitable for use in REM devices are described in U.S. patent application Ser. No. 10/066,210 (filed Jan. 31, 2002). Ionic liquid electrolytes containing pyrrolidinium and N-methylpyrrolidinium cations have been found to provide particularly high current carrying capability (>10 mA/cm2) for reversible electrodeposition of silver, copper, zinc and tin in halide systems, and to offer reasonably high electrical resistivity (300–2000 ohm-cm). Good mirror uniformity has been obtained with these cations in REM cells having small electrode spacing (0.2 mm). Systems incorporating mixtures of the two cations and/or different halides (chloride and bromide, for example) are apparently stable over the range from at least −20° C. to 150° C. Because of the protic nature of the cations, ceramic gelling agents involving hydrogen bonding, highly dispersed silica (HDS) for example, can be used to provide more rigid pyrrolidinium-based ionic liquid electrolytes.

The REM device is intended for use in conjunction with a source of voltage 118, which has a reversible polarity and adjustable or pre-set positive and negative voltage values, connected between the mirror and counter electrodes 106 and 110 (see FIG. 1). When a negative electrical voltage is applied to the mirror electrode 106 relative to the counter electrode 110, metal 114 deposited on the counter electrode 110 is dissolved from the counter electrode into the electrolyte 112, while metal ions 116 in the electrolyte are electrodeposited from the electrolyte onto the surface modification layer 108 of the mirror electrode 106. The surface modification layer 108 causes the metal to deposit in a substantially uniform layer, forming a mirror surface. When the polarity of the applied voltage is reversed, such that a positive voltage is applied to the mirror electrode 106 relative to the counter electrode 110, deposited metal is dissolved from the mirror electrode into the electrolyte 112 and dissolved metal is electrodeposited from the electrolyte onto the counter electrode.

The thickness of electrodeposited mirror metal layer 120 present on the mirror electrode determines the reflectivity of the mirror for radiation, which can be varied over a wide range from nearly 0% to almost 100% reflective The lower limit of reflectivity for the REM device is affected by the reflectivities of the nucleation layer 108, the electrode 106, and the substrate 102. These reflectivities may be reduced by use of anti-reflection coatings of the type commonly employed, or by adjusting the layer thicknesses. Likewise, the maximum reflectivity of the REM device is affected by light absorption in the substrate 102, the electrode 106, and the nucleation layer 108.

All of the various layers that affect the overall reflectivity of the REM device for radiation, particularly the layer 120 of deposited mirror metal, must typically be very uniform in thickness to provide the highly uniform reflectance over the mirror surface required for most applications. When this is the case, a given mirror metal thickness corresponds to a definite amount of mirror metal with respect to the charge required for its electrodeposition or dissolution. Note that these processes generally occur with nearly 100% charge efficiency for REM electrolytes.

In principle, the thickness of the mirror metal deposit could be known at any given time by incorporating a charge integration device 119 (FIG. 1) and keeping track of all the charge passed for metal electrodeposition and dissolution as the mirror state was cycled. Device 119 could be a coulometer for direct measurement and integration of charge or an ammeter coupled with a current integration device. As the mirror is subjected to multiple cycles in which complete erasure of the mirror metal does not occur, however, measurement imprecision and minor efficiency imbalances between the metal electrodeposition and dissolution reactions can introduce cumulative errors in the calculated thickness and associated reflectance. These errors could be mitigated by periodic full erasure of mirror metal layer 120 from mirror electrode 106 to establish a new starting point for the charge integration, but this would be impractical for large numbers of cycles and the necessity of such periodic erasure would be unacceptable for many applications. In addition, the equipment required for accurate coulometric tracking is relatively expensive.

A more precise approach for determining the thickness of deposited mirror metal is to measure the sheet resistance of the mirror electrode. From FIG. 1, it is evident that the measured sheet resistance will include parallel contributions from mirror electrode 106, nucleation layer 108, and mirror metal layer 120. Note that the electrolyte resistance is generally high enough that the currents flowing along electrolyte layer 112 and counter electrode layers 110 and 114 are small. In addition, nucleation layer 108 is typically very thin (15–30 Å) and has a minimal effect on the sheet resistance of mirror electrode 106, which is about 10 ohm/square for the indium tin oxide typically used. Consequently, the thickness of mirror metal layer 120 has the largest effect on the measured sheet resistance.

Sheet resistance is normally defined as the electrical resistance per unit area of a layer or sheet of a given material and is measured in such a way that contact resistances and contributions from contiguous layers of other materials are negligible or taken into account. Throughout this document, unless stated otherwise, the term "sheet resistance" is used to denote the resistance measured between two separate contacts attached to the mirror electrode of a REM device and specifically includes contributions from contiguous and adjacent layers of other materials. Contact resistances associated with the interfaces between the electrical contacts and the mirror electrode, which are in series with the mirror electrode sheet resistance, are typically small enough to be negligible or are relatively constant with time so that their effect can be taken into account by periodic calibration.

It is a relatively simple matter to measure the mirror electrode sheet resistance as a function of mirror metal thickness to provide a calibration curve for future measurements or for other devices of the same type. By utilizing the change in resistance produced by the deposited mirror metal and periodically re-measuring the sheet resistance of the electrode without a mirror metal deposit, the effects of variations with time and from device to device can be minimized. The thickness of the mirror metal deposit can readily be ascertained from the charge passed, using the bare electrode as the baseline. By also measuring the reflectance of the REM device as a function of mirror metal thickness, the device reflectance can then be determined by measuring the mirror electrode sheet resistance. Note that this calibration approach will also yield accurate measurements of the mirror metal thickness and device reflectance for other electrode geometries and placements of the electrical contacts.

Figure 2:
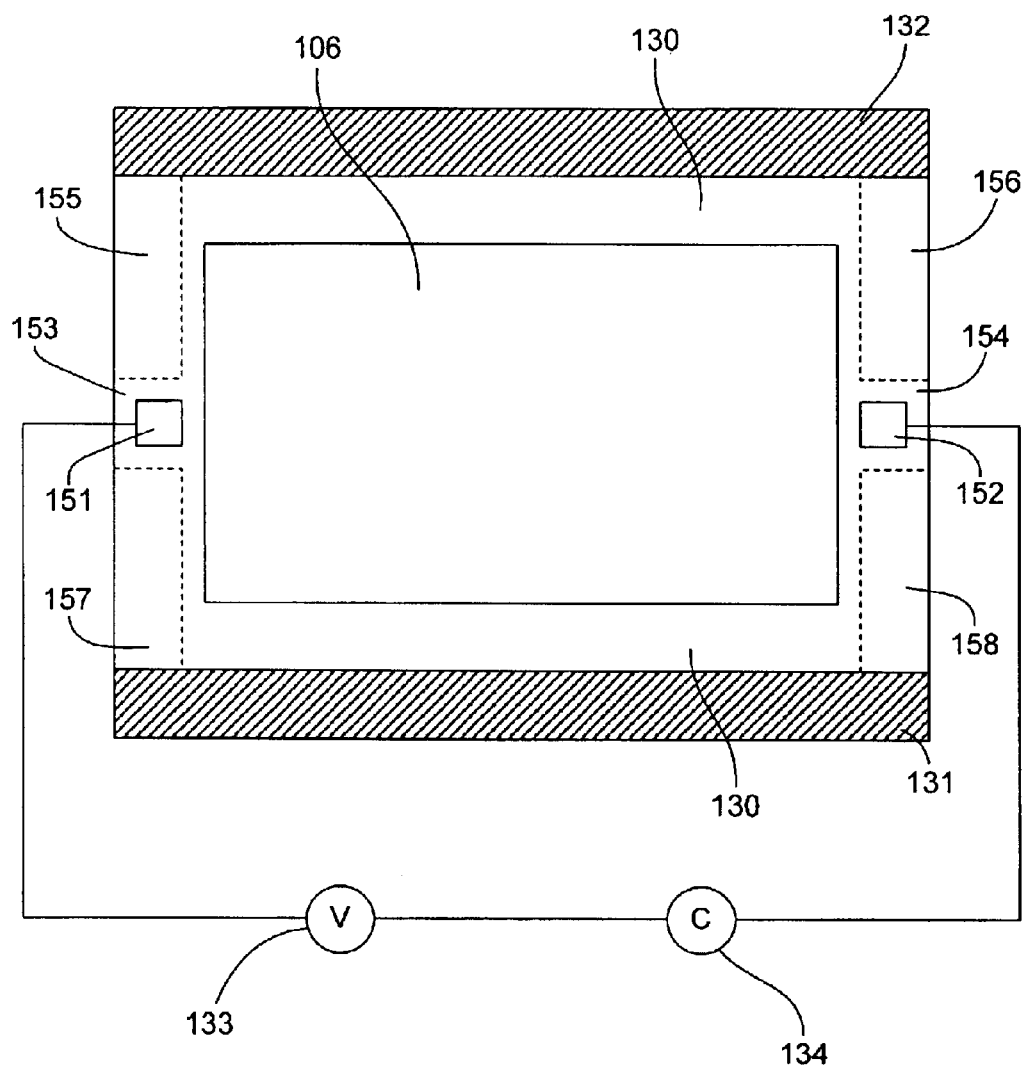
FIG. 2 is a schematic representation of a REM mirror electrode (as viewed from the electrolyte side) illustrating a suitable arrangement of separate contacts for applying the switching voltage and measuring the mirror electrode sheet resistance during mirror state switching.

FIG. 2 illustrates placement of separate electrical contacts on the mirror electrode to provide internal electrical isolation for the circuit used to measure the mirror electrode sheet resistance, thereby permitting the thickness of the mirror metal deposit to be determined while the mirror state is being switched. In the illustrated embodiment of this approach, electrical contacts 151 and 152 for measuring the sheet resistance are placed on the sides of electrode 106 not having contacts 131 and 132, which are used to apply the mirror switching voltage (circuit not shown). The resistance between contacts 151 and 152 is measured by applying a voltage via voltage source 133 and measuring the current response via current measuring device 134. By making contacts 151 and 152 relatively small and locating them midway between contacts 131 and 132, flow of the measurement current along contacts 131 and 132 is minimized by the relatively high sheet resistance of layer 106. Small area contacts also minimize shunting across the contact that might locally decrease the uniformity of the mirror deposit. The measured sheet resistance in this case is proportional to the thickness of the mirror metal layer 120 and can be calibrated to provide a measure of the mirror reflectance. Further electrical isolation of contacts 151 and 152 from contacts 131 and 132 can be attained by placing contacts 151 and 152 on tabs 153 and 154 of mirror electrode material 106, as indicated by the dashed line in FIG. 4. Bare substrate areas 155, 156, 157 and 158 minimize current flow between the measurement contacts (151 and 152) and the buss bars (131 and 132) used to switch the mirror state. There are numerous contact arrangements that would provide relative sheet resistance values for determining the mirror metal thickness. For example, contact 152 could be eliminated and the resistance between contact 151 and electrically shorted contacts 131 and 132 could be measured.

An alternating current (AC) measurement for determining the sheet resistance has the advantage of minimizing voltage losses due to contact resistances, which may vary appreciably with time and would introduce errors in the measurement. The voltage perturbation frequency is preferably chosen to minimize the effects of capacitive and inductive losses, as indicated by a near-zero phase shift between the applied AC voltage and the AC current response. In some cases, it may be necessary to take this phase shift into account to calculate an accurate sheet resistance for the mirror electrode. The magnitude of the applied voltage perturbation is not critical but is preferably chosen to yield a current response that is large enough to enable accurate measurement of the current response but not so large that functioning or control of the REM device is impaired, e.g., by Joule heating effects.

According to the present invention, mirror uniformity and switching speed are optimized for REM devices by utilizing lower drive voltages when the sheet resistance of the mirror electrode is high, and utilizing higher drive voltage when the sheet resistance is reduced by the presence of an appreciable thickness of the mirror metal. In this case, the IR voltage drop along the mirror electrode surface (sheet voltage drop), which is primarily responsible for mirror nonuniformity, is maintained at a relatively low value via a combination of low current and low sheet resistance. Fast switching overall can be attained by using much higher voltages/currents when the sheet resistance is low to compensate for the lower voltages/currents needed when the mirror metal deposit is relatively thin.

For even faster switching, a safe applied voltage that avoids electrode damage or electrolyte decomposition can be augmented by the IR drop in the electrolyte (when sufficient mirror metal is present to adequately reduce the electrode sheet resistance). This additional voltage produces no detrimental effects on the electrode surfaces or the electrolyte since it does not appear across the electrode-electrolyte interfaces. Such IR-compensated switching is particularly important for REM devices employing ionic liquids with pyrrolidinium (P+) and N-methylpyrrolidinium (MP+) cations. For such devices, a large drive voltage (typically more than one volt) is required to overcome the high resistance of the electrolyte but the amine protons on these cations are reduced at very low electrode potentials (around 0.1 V). Fast switching in this case is attained without electrolyte breakdown by increasing the voltage from 0.1 V by the IR drop in the electrolyte, and removing this IR compensation as the current decreases during mirror erasure.

In practice, a negative voltage is applied to initiate mirror formation on the bare mirror electrode and the voltage is stepped or ramped to more negative values as the mirror is metal is deposited. A positive voltage is applied to initiate mirror erasure and the voltage is stepped or ramped to less positive values as the mirror metal deposit is dissolved. Feedback mechanisms and the plating and erasure voltage waveforms are chosen to provide the required level of control and the desired compromise between mirror uniformity and switching speed. In some cases, especially for switching between a mirror state and full erasure, simple voltage ramps as a function of time without feedback of the thickness of the mirror deposit can provide adequate results. For most applications, however, it is advantageous to have the applied switching voltage depend directly on the thickness of the mirror metal deposit. The latter can be monitored by integrating the charge passed during mirror formation and erasure. Imbalances in the anodic and cathodic processes, however, as well as cumulative measurement errors, can introduce large uncertainties unless the mirror is frequently erased fully to establish a known starting point.

Optimum results with respect to mirror uniformity and switching speed are provided by closely matching the REM drive voltage to the mirror deposit thickness and the electrolyte temperature. As described above and in U.S. Pat. No. 6,301,039 to Tench, the deposit thickness can be determined accurately from its effect on the sheet resistance of the mirror electrode, preferably measured using an alternating current (AC) perturbation applied between two separate contacts on the mirror electrode outside the cell seal area. Drive voltages should be limited so that currents remain below the diffusion-limited currents for mirror metal electrodeposition and dissolution, and should be lowered at elevated temperatures. Excessively fast plating rates can lead to powdery deposits, and excessively fast erasure rates can lead to salt precipitation in some electrolytes. Higher drive voltages are needed to compensate for increased electrolyte resistance and slower reaction rates at low temperatures so as to provide suitably fast switching rates. Temperature also needs to be taken into account to provide an accurate measure of the deposit thickness from the mirror electrode sheet resistance. Thermocouples, thermistors, and a variety of other devices can be used to measure the electrolyte temperature.

The specific voltage algorithm for optimum REM switching according to the present invention depends on the electrolyte properties (e.g., conductivity and concentrations of reactants), electrode spacing and geometry (e.g., shape, size and curvature), electrical contact configuration and geometry, temperature effects, and the desired compromise between mirror uniformity and switching speed. The optimum algorithm for a given device can be determined empirically, using spatial variations in mirror reflectance for feedback, or by electrical modeling based on the device geometry, material properties, and electrochemical characteristics. On the other hand, significant improvement in mirror uniformity without undue sacrifice in switching speed can be attained via relatively simple drive voltage algorithms, e.g., linear voltage variations as a function of thickness for relatively thin mirror deposits and constant voltage when the deposit thickness is greater than a critical value providing an acceptably low electrode sheet resistance. In any case, it is important to ensure that the erasure voltage is reduced when the current decreases in the final stages of erasure so that excessive voltage is not applied to the bare mirror electrode surface, which might cause damage to the nucleation layer or electrolyte breakdown.

In a preferred approach, the REM device is automatically switched via a computing device (computer or microprocessor, for example) according to a drive voltage algorithm based on real-time measurements of the electrode sheet resistance, device switching current and temperature. Even sophisticated REM drive voltage algorithms based on feedback from sheet resistance and temperature measurements can be inexpensively implemented for high-volume production via modern integrated circuit (IC) and logic chip technologies. Ideally, a semiconductor control device would apply the appropriate drive voltage based on almost continuous measurements of the mirror electrode sheet resistance and the electrolyte temperature. The control device would include the capability of measuring the mirror electrode sheet resistance by applying an AC voltage perturbation across electrical contacts on the mirror electrode and analyzing the current response.

Although the approach above focuses on direct control of the drive voltage for REM devices, indirect control of the voltage via the device switching current could also be used to practice the invention. However, this would involve somewhat more complicated drive circuitry and would provide little or no advantage compared to direct voltage control.

Fabrication of a Preferred Embodiment

The preferred mirror electrode utilizes a glass or plastic substrate which is uniformly coated on one side with an optically transparent conductive film, e.g., indium tin oxide (ITO) or fluorine-doped tin oxide (FTO), which has relatively low resistivity (about 10 ohm/square) and serves as the mirror electrode and current collector. A very thin layer of inert metal (15–30 Å platinum, for example) is preferably sputtered onto the ITO or FTO surface to enhance the uniformity of nucleation to provide a mirror deposit.

The preferred counter electrode depends on whether the device is designed to control light transmission or reflectance. For REM devices involving adjustable transmittance, the preferred counter electrode is locally distributed, as described in U.S. Pat. No. 5,903,382 to Tench et al. In this case, the counter electrode comprises an electrochemically inert metal grid or nucleation layer matrix pattern of relative small overall area, so that metal plated on the counter electrode blocks only a small fraction of the radiation. For adjustable reflectivity REM devices, the preferred counter electrode comprises a reasonably thick (e.g., 1 $\mu$m) layer of mirror metal on an electrochemically stable conducting substrate, e.g., 50 Å Pt on an ITO/glass or plastic substrate. Suitable counter electrodes for adjustable reflectivity devices are described in U.S. Pat. No. 6,166,847 to Tench et al.

One preferred electrolyte, comprised of silver ions and an excess of halide anions in a nonaqueous solvent, preferably gamma-butyrolactone (GBL), is described in U.S. Pat. No. 6,400,491 to Tench et al. A preferred ionic liquid electrolyte, comprised of silver ions, halide anions and pyrrolidinium-based cations, is described in U.S. patent application Ser. No. 10/066,210 (filed Jan. 31, 2002).

Although the REM device can be fabricated using a liquid electrolyte, use of an electrolyte stiffener is preferred for many applications. Preferred electrolyte stiffeners are dispersed inorganic materials, e.g., highly dispersed silica (HDS) or alumina, which form thixotropic gels that can be liquefied by mechanical shearing for facile injection in REM cells, and typically have minimal effect on the electrolyte conductivity and REM performance.

For adjustable mirror applications, a coloring agent is preferably added to the REM electrolyte so that light reflection is minimized for the non-mirror state. A preferred coloring agent in this case is dispersed carbon black, which, in small amounts, provides high light absorption over a wide spectral range, and tends to protect the electrolyte from degradation by ultraviolet light. The carbon black is preferably suspended by ultrasonic agitation and maintained in suspension by subsequent addition of an electrolyte stiffener.

The reversible electrochemical cells pertaining to this invention can be fabricated using spacers and a polymer sealant, or using a gasket or o-ring to provide both the proper spacing and a seal. The preferred electrode separation is about 0.05–3.0 mm. The electrodes may be planar or curved.

REM cells may have any geometric shape but those exhibiting a high degree of symmetry (e.g., rectangles or circles) are more amenable to uniform mirror switching. The preferred REM cell geometry is rectangular or square with the electrical contacts for switching the mirror state being provided by copper strips attached with conductive adhesive that run the length of two opposite sides. Contacts are preferably placed outside the seal area so that they are not in contact with the electrolyte. The same contacts can be used to measure the sheet resistance of the mirror electrode, preferably using an applied alternating voltage having a frequency (e.g., 1–30 kHz) for which the phase shift of the corresponding current approaches zero. For measuring the sheet resistance while the REM mirror state is switched, a preferred approach is to provide separate small-area contacts located midway on the sides of the device not having the contacts for applying the switching voltage.

The sheet resistance is calibrated in terms of the thickness of mirror metal on the mirror electrode, preferably by measuring the charge required to deposit a given amount of mirror metal. After calibration via standard reflectance measurement methods, the sheet resistance provides an accurate measure of the device reflectance.

EXAMPLE 1

Mirror Uniformity Improvement Via Drive Voltage Ramping

An adjustable reflectivity REM device having a rectangular viewing area of approximately 8.3×8.7 cm was constructed using a mirror working electrode comprised of a 15 Å sputtered platinum nucleation layer on a 10-ohm/square ITO film on a glass substrate (10 cm square). The counter electrode was 60 Å sputtered Pt on 10 ohm/square ITO on a glass substrate (10 cm square), which had been electroplated with about 1 $\mu$m of silver from a commercial cyanide bath (Technisilver 2E, Technic Co.) and annealed at 200° C. for 30 minutes in a reducing atmosphere (to improve adhesion) prior to cell assembly. A bare Pt/ITO border was left around the plated silver (via masking with platers' tape) to permit formation of a good seal with acrylic adhesive tape (VHB #4910, 3M Company), which also overlapped the plated silver to protect its edges. This acrylic tape (about 6 mm wide) served as both the electrode spacer (1 mm) and primary sealant and was recessed from the edges of the glass panes so as to leave room for 3-mm wide copper buss bars, which were attached to the Pt/ITO layer around the perimeter of the device with conductive adhesive (C665, Furon Co.).

Electrolyte preparation and final device assembly were performed inside a nitrogen atmosphere glove box to avoid contamination with oxygen, which reacts electrochemically and can cause mirror self-erasure via chemical dissolution of the mirror metal. The electrolyte was injected through the acrylic tape using a pair of hypodermic needles (inlet and outlet) and a syringe. Epoxy was used to provide a second seal and to help hold the buss bars in place. The electrolyte contained 1.5 M AgI+2.0 M LiBr+63 mg/mL highly dispersed silica (M-5 Cab-O-Sil, Cabot Co.)+1.5 mg/mL carbon black (Vulcan, Cabot Co.) in high-purity GBL solvent (<20 ppm water). Addition of the highly dispersed silica produced a thixotropic gel that could be liquefied by stirring but became stiff upon standing. This REM device exhibited excellent mirror quality (reflectance at 700 nm wavelength of 6.0% minimum, and 80% with a 400 Å silver deposit) and could be switched repetitively without change in reflectance for a given amount of silver deposited on the mirror electrode.

Constant and ramped drive voltages for REM switching were provided by a PAR Model 273 potentiostat in the two-electrode mode. Reflectance measurements were made at the center and as near to one corner of the REM device as permitted by the required measurement area (1.5×2.5 cm) using a double reflection technique with a Cary 5 photospectrometer. Mirrors for erasure tests were plated at –0.30 V until a reflectance of 66% was attained.

Figure 3:
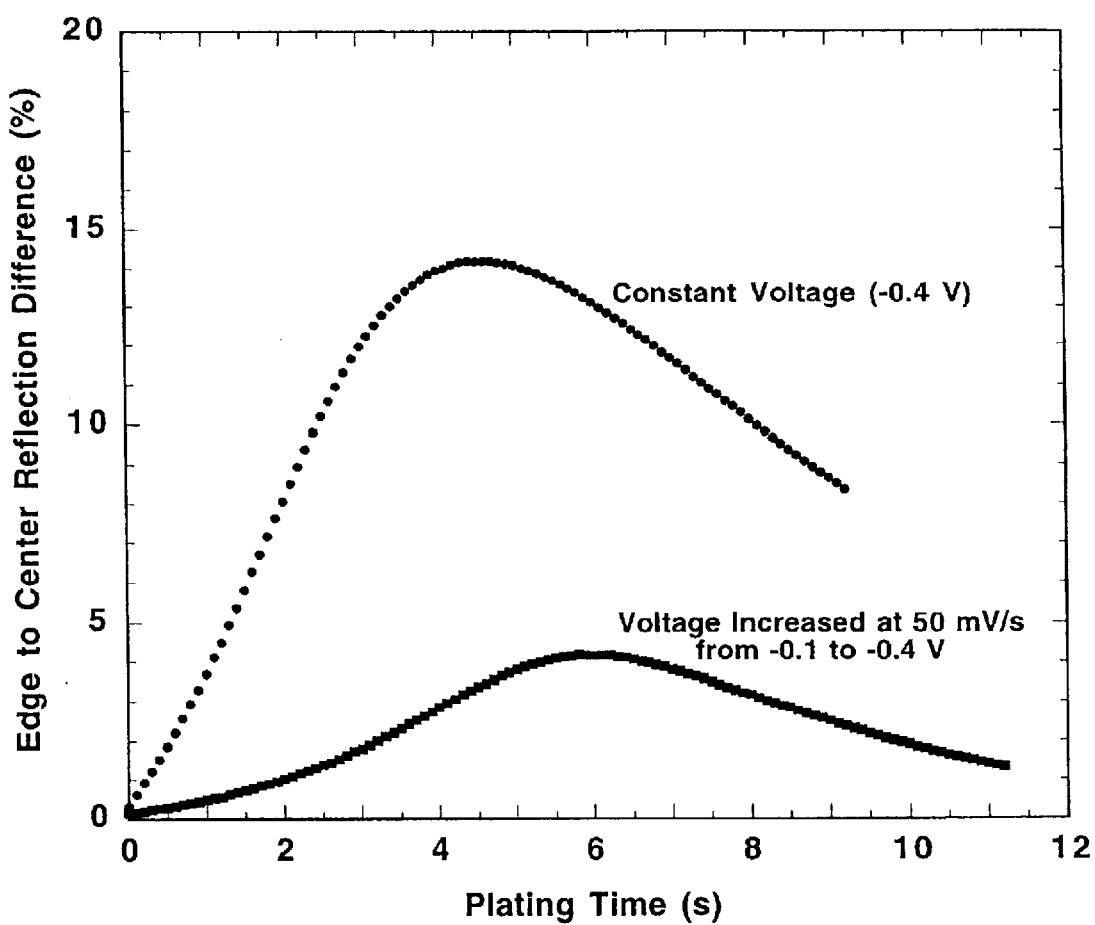
FIG. 3 gives plots of the difference in reflectance between the center and a corner of a rectangular REM reflective device (8.3×8.7 cm mirror) as a function of plating time for mirrors formed at constant voltage (−0.40 V) and by ramping the voltage from −0.10 V to a maximum of −0.40 V at 50 mV/s.

FIG. 3 gives plots of the difference in reflectance between the center and a corner of the rectangular REM reflective device as a function of plating time for mirrors formed at constant voltage (–0.40 V) and by ramping the voltage from –0.10 V to a maximum of –0.40 V at 50 mV/s. Whereas the maximum reflectance difference for mirrors formed at the constant voltage was about 14%, this value was reduced to about 4% when the 50 mV/s voltage ramp was used.

Figure 4:
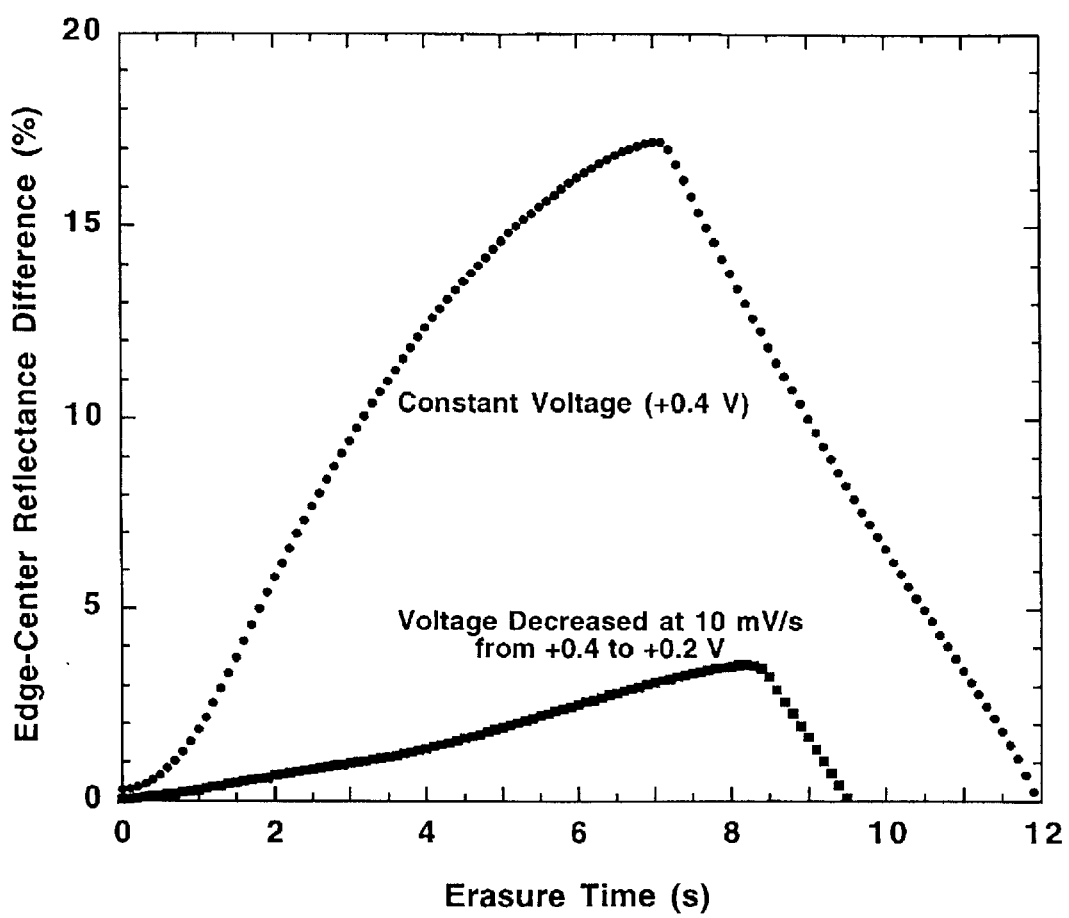
FIG. 4 gives plots of the difference in reflectance between the center and a corner of the REM reflective device of FIG. 3 as a function of time for erasure of 66% reflective mirrors (formed by the voltage ramping procedure of FIG. 3) at constant voltage (+0.40 V) and by ramping the voltage from +0.40 V to a minimum of +0.2 V at 10 mV/s.

FIG. 4 gives plots of the difference in reflectance between the center and a corner of the rectangular REM reflective device as a function of time for erasure of 66% reflective mirrors (formed by the voltage ramping) at constant voltage (+0.40 V) and by ramping the voltage from +0.40 V to a minimum of +0.2 V at 10 mV/s. Whereas the maximum reflectance difference for mirrors erased at the constant voltage was about 17%, this value was reduced to less than 4% when the 10 mV/s voltage ramp was used.

These results with simple voltage ramps demonstrate the efficacy of the present invention in providing improved REM mirror uniformity by utilizing lower plating and erasure voltages (less negative and less positive, respectively) when the mirror electrode sheet resistance is higher because the mirror metal deposit is thinner. It is obvious that closely matching the drive voltages to the current-carrying capability of the mirror metal deposit would provide the optimum compromise between mirror uniformity and switching speed.

EXAMPLE 2

Mirror Electrode Sheet Resistance Measurement during REM Switching

The ability to measure the REM mirror electrode sheet resistance during mirror state switching was demonstrated for a cell similar to that in Example 1 but having a mirror electrode with buss bars along only two opposite sides, and two separate contacts on the other two sides for sheet resistance measurements (configuration shown in FIG. 2). For this cell, the mirror viewing area was a 7.4×7.3 cm rectangle, the buss bars for applying the switching voltage ran along the longest side with their inside edges 9.2 cm apart, and the contacts for measuring the sheet resistance were 6 mm square and spaced 9.3 cm apart. The sheet resistance was measured with a 5 mV voltage perturbation at a frequency of 28 kHz using a Hewlett-Packard Model 4194A Network Analyzer while a constant voltage (+0.30 V) was applied between the electrodes via an automobile battery and a voltage divider to switch the mirror state. The battery arrangement was used to circumvent equipment grounding difficulties but undoubtedly introduced errors in the silver thickness determination, which was based on the charge passed during a given time assuming that the current remained constant (which was only approximately true). Switching between plating and erasure was accomplished by switching the cell leads, which may also have introduced contact resistance errors.

Figure 5:
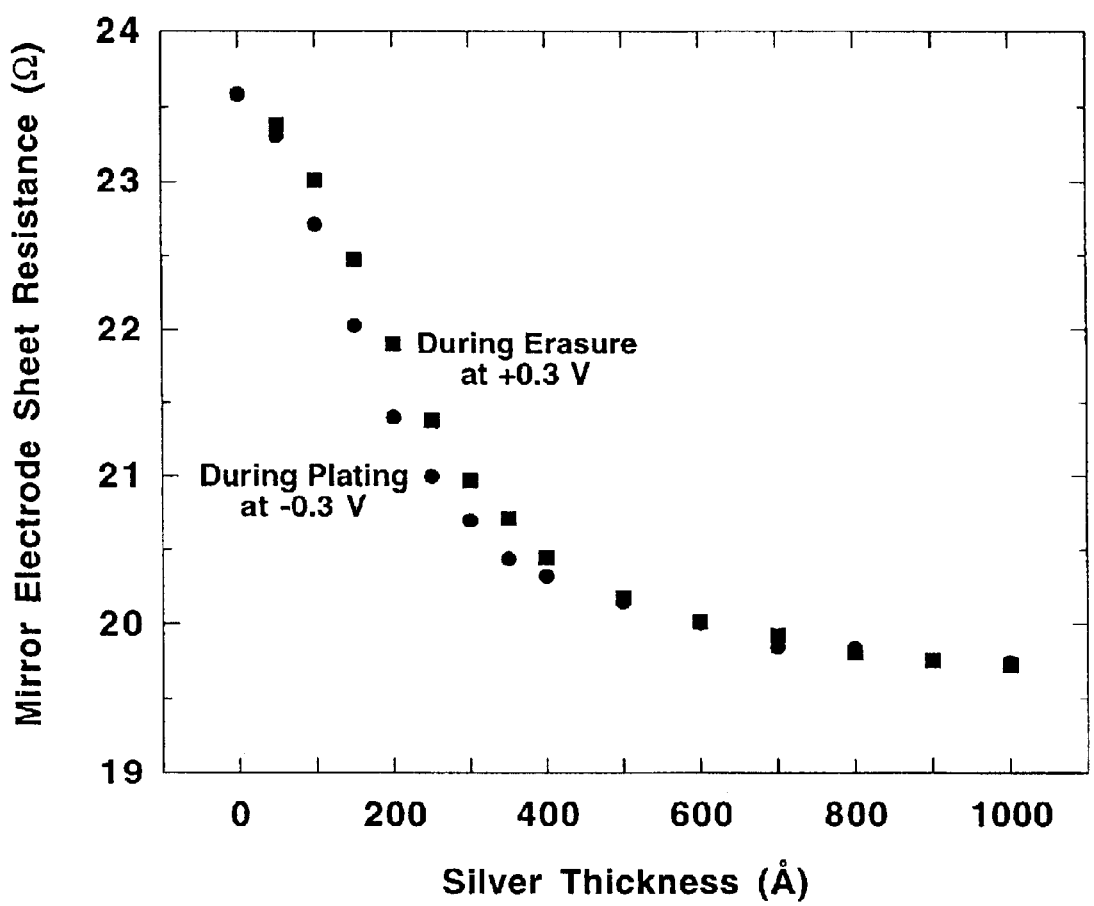
FIG. 5 gives plots of the mirror electrode sheet resistance for a REM device as a function of the mirror metal (silver) deposit thickness measured during mirror plating and erasure (using the mirror electrode configuration of FIG. 2).

FIG. 5 gives plots of the mirror electrode sheet resistance for the REM device as a function of the mirror metal (silver) deposit thickness measured during mirror plating at –0.30 V and erasure at +0.30 V. Note that the absolute value of the measured sheet resistance depends strongly on geometric factors but is readily calibrated to provide a reliable measure of the deposit thickness. Good sensitivity of the sheet resistance to silver thickness over a wide range is evident. Sensitivity is particularly good at silver thicknesses below 400 Å, which provides nearly the maximum reflectance. Differences in the plating and erasure curves are not large but probably result primarily from measurement errors associated with the relatively crude demonstration apparatus used. Measurement errors should be negligible for properly engineered equipment.

These results demonstrate that optimum REM switching according to the present invention can be attained by utilizing measurements of the mirror electrode sheet resistance as feedback for determining the appropriate drive voltage. It is also necessary to take temperature into account for both calculation of the silver deposit thickness from the measured sheet resistance and for specifying the drive voltage.

EXAMPLE 3

Computer Programmed Switching of REM Devices

A computer program was written for a personal computer in LabView® version 5.0 (National Instruments, Austin, Tex.) to automatically switch REM devices according to a drive voltage algorithm based on real-time measurements of the electrode sheet resistance, device switching current and temperature. User inputs to the computer program include the electrolyte resistance as a function of temperature (slope and intercept for linear plot of inverse electrolyte resistance vs temperature), maximum allowable voltage drop for the mirror electrode sheet resistance, safe voltage to be applied when the device current is negligibly small (minimum applied voltage), and maximum voltage for avoiding diffusion-limited deposition/dissolution of mirror metal. A version of this program written for use with a power supply instead of a potentiostat utilizes a maximum current limitation (instead of a maximum voltage). The magnitude of the minimum voltage is usually the same for plating and erasure and this voltage is applied (with the correct polarity) to initiate mirror plating or erasure. From the current flowing at the minimum voltage, the electrolyte IR drop and mirror electrode sheet resistance are calculated. The applied voltage is increased by the smaller of some predetermined percentage of the electrolyte IR drop or the voltage that corresponds to the maximum allowable sheet voltage drop for the mirror electrode. A percentage of the electrolyte IR drop (typically 75%) is used to avoid overshooting the target voltage. The process of measuring (current, sheet resistance and temperature), calculating IR drops, and appropriately increasing or decreasing the applied voltage is repeated continuously and rapidly throughout the switching operation. During mirror erasure, the IR compensation is removed as the current decreases, which avoids electrode damage and electrolyte breakdown in the later stages of erasure when the current is small.

This computer program was used (in conjunction with a personal computer, an electronic potentiostat and a custom-made device for measuring the mirror electrode sheet resistance) to switch REM devices between the fully erased and mirror states, and between intermediate mirror states. The custom-made impedance measuring device was battery-powered and utilized an 1 kHz AC voltage perturbation (50–100 mV peak to peak). A commercial impedance measuring device could be used, with precautions to avoid grounding problems resulting from the use with other AC equipment.

A variety of REM devices were switched according to the voltage algorithm and computer program described above. For large-area devices (about 10×10 cm square), the programmed switching provided a significant visual improvement in the uniformity of the mirror deposits compared to that for switching at constant voltage.

The preferred embodiments of this invention have been illustrated and described above. Modifications and additional embodiments, however, will undoubtedly be apparent to those skilled in the art. Furthermore, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more indicative of the full scope of the invention.

We claim:

1. A method for optimizing the mirror uniformity and switching speed of a reversible electrochemical mirror of the type including a mirror electrode, a counter electrode, and an electrolyte disposed between and in electrical contact with the mirror and counter electrodes, wherein the electrolyte contains cations of an electrodepositable mirror metal, comprising the steps of:

applying a first negative voltage to the mirror electrode relative to the counter electrode so that mirror metal is deposited onto the mirror electrode at a first rate; and applying a second negative voltage more negative than the first negative voltage to the mirror electrode relative to the counter electrode so that additional mirror metal is deposited onto the mirror electrode at a second rate which is faster than the first rate, wherein the second negative voltage does not exceed a predetermined maximum drive voltage.

2. The method of claim 1, wherein the second negative voltage is increased with time so that the rate at which additional mirror metal is deposited on the mirror electrode increases with time.

3. The method of claim 2, wherein the second negative voltage is increased with time continuously.

4. The method of claim 2, wherein the second negative voltage is increased with time in steps.

5. The method of claim 1, wherein the second negative voltage is increased based on the amount of charge passed between the mirror electrode and the counter electrode.

6. The method of claim 1, wherein the predetermined maximum drive voltage corresponds to a current that is less than the diffusion-limited current for electrodeposition of the mirror metal.

7. The method of claim 1, further comprising the steps of:

measuring the sheet resistance between two locations on the mirror electrode; and measuring the current flowing between the mirror electrode and the counter electrode, wherein the second negative voltage is such that the multiplication product of the measured sheet resistance and the measured current is less than a predetermined maximum sheet IR drop.

8. The method of claim 7, wherein said step of measuring the sheet resistance comprises the steps of applying an alternating voltage between two electrical contacts on the mirror electrode and measuring an alternating current response to the alternating voltage.

9. The method of claim 7, wherein said step of measuring the sheet resistance comprises the steps of applying a direct voltage between two electrical contacts on the mirror electrode and measuring a direct current response to the direct voltage.

10. The method of claim 7, further comprising the step of:

determining the electrical resistance of the electrolyte between the mirror electrode and the counter electrode, wherein the first negative voltage is a substantially safe voltage with respect to damage to the mirror electrode and breakdown of the electrolyte when no mirror metal is present on the mirror electrode, and wherein the magnitude of the second negative voltage is the smaller of:

the predetermined maximum drive voltage;

the sum of the safe voltage and the electrolyte voltage drop, the latter being equal to the multiplication product of the measured current and the measured electrolyte resistance; and that which will cause the multiplication product of the measured sheet resistance and the measured current to be less than the predetermined maximum sheet IR drop.

11. The method of claim 10, further comprising the steps of:

measuring the temperature of the mirror; and adjusting the second negative voltage to account for the temperature dependence of the electrolyte resistance.

12. The method of claim 10, further comprising the steps of:

measuring the temperature of the mirror; and adjusting the second negative voltage to account for the temperature dependence of the mirror electrode sheet resistance.

13. A method for optimizing the mirror uniformity and switching speed of a reversible electrochemical mirror of the type including a mirror electrode, a counter electrode, and an electrolyte disposed between and in electrical contact with the mirror and counter electrodes, wherein the electrolyte contains cations of an electrodepositable mirror metal, comprising the steps of:

applying a first positive voltage to the mirror electrode relative to the counter electrode so that mirror metal is dissolved from the mirror electrode at a first rate; and applying a second positive voltage less positive than the first positive voltage to the mirror electrode relative to the counter electrode so that additional mirror metal is dissolved from the mirror electrode at a second rate which is slower than the first rate, wherein the first positive voltage does not exceed a predetermined maximum drive voltage.

14. The method of claim 13, wherein the second positive voltage is decreased with time so that the rate at which mirror metal is dissolved from the mirror electrode decreases with time.

15. The method of claim 14, wherein the second positive voltage is decreased with time continuously.

16. The method of claim 14, wherein the second positive voltage is decreased with time in steps.

17. The method of claim 13, wherein the second positive voltage is decreased based on the amount of charge passed between the mirror electrode and the counter electrode.

18. The method of claim 13, wherein the predetermined maximum drive voltage corresponds to a current that is less than the diffusion-limited current for dissolution of the mirror metal.

19. The method of claim 13, further comprising the steps of:
measuring the sheet resistance between two locations on the mirror electrode; and
measuring the current flowing between the mirror electrode and the counter electrode,
wherein the second positive voltage is such that the multiplication product of the measured sheet resistance and the measured current is less than a predetermined maximum sheet IR drop.

20. The method of claim 19, wherein said step of measuring the sheet resistance comprises the steps of applying an alternating voltage between two electrical contacts on the mirror electrode and measuring an alternating current response to the alternating voltage.

21. The method of claim 19, wherein said step of measuring the sheet resistance comprises the steps of applying a direct voltage between two electrical contacts on the mirror electrode and measuring a direct current response to the direct voltage.

22. The method of claim 19, further comprising the step of:
determining the electrical resistance of the electrolyte between the mirror electrode and the counter electrode,
wherein the first positive voltage is a substantially safe voltage with respect to damage to the mirror electrode and breakdown of the electrolyte when no mirror metal is present on the mirror electrode, and
wherein the magnitude of the second positive voltage is the smaller of:
the predetermined maximum drive voltage;
the sum of the safe voltage and the electrolyte voltage drop, the latter being equal to the multiplication product of the measured current and the measured electrolyte resistance; and
that which will cause the multiplication product of the measured sheet resistance and the measured current to be less than the predetermined maximum sheet IR drop.

23. The method of claim 22, further comprising the steps of:
measuring the temperature of the mirror; and
adjusting the second positive voltage to account for the temperature dependence of the electrolyte resistance.

24. The method of claim 22, further comprising the steps of:
measuring the temperature of the mirror; and
adjusting the second positive voltage to account for the temperature dependence of the mirror electrode sheet resistance.

25. A method for optimizing the mirror uniformity and switching speed of a reversible electrochemical mirror of the type including a mirror electrode, a counter electrode, and an electrolyte disposed between and in electrical contact with the mirror and counter electrodes, wherein the electrolyte contains cations of an electrodepositable mirror metal, comprising the steps of:
applying a first negative voltage to the mirror electrode relative to the counter electrode so that mirror metal is deposited onto the mirror electrode at a first rate, wherein the first negative voltage is a substantially safe voltage with respect to damage to the mirror electrode and breakdown of the electrolyte when no mirror metal is present on the mirror electrode;
measuring the sheet resistance between two locations on the mirror electrode;
measuring the current flowing between the mirror electrode and the counter electrode;
determining the electrical resistance of the electrolyte between the mirror electrode and the counter electrode; and
applying a second negative voltage more negative than the first negative voltage to the mirror electrode relative to the counter electrode so that additional mirror metal is deposited onto the mirror electrode at a second rate which is faster than the first rate,
wherein the magnitude of the second negative voltage is the smaller of:
a predetermined maximum drive voltage;
the sum of the safe voltage and the electrolyte voltage drop, the latter being equal to the multiplication product of the measured current and the measured electrolyte resistance; and
that which will cause the multiplication product of the measured sheet resistance and the measured current to be less than a predetermined maximum sheet IR drop.

26. The method of claim 25, further comprising the steps of:
measuring the temperature of the mirror; and
adjusting the second negative voltage to account for the temperature dependence of the electrolyte resistance and the temperature dependence of the mirror electrode sheet resistance.

27. A method for optimizing the mirror uniformity and switching speed of a reversible electrochemical mirror of the type including a mirror electrode, a counter electrode, and an electrolyte disposed between and in electrical contact with the mirror and counter electrodes, wherein the electrolyte contains cations of an electrodepositable mirror metal, comprising the steps of:
applying a first positive voltage to the mirror electrode relative to the counter electrode so that mirror metal is dissolved from the mirror electrode at a first rate, wherein the first positive voltage does not exceed a predetermined maximum drive voltage;
measuring the sheet resistance between two locations on the mirror electrode;
measuring the current flowing between the mirror electrode and the counter electrode;
determining the electrical resistance of the electrolyte between the mirror electrode and the counter electrode; and
applying a second positive voltage less positive than the first positive voltage to the mirror electrode relative to the counter electrode so that additional mirror metal is dissolved from the mirror electrode at a second rate which is slower than the first rate, wherein the magnitude of the second positive voltage is the smaller of:

the predetermined maximum drive voltage;

the sum of a safe voltage with respect to damage to the mirror electrode and breakdown of the electrolyte when no mirror metal is present on the mirror electrode plus the electrolyte voltage drop, the latter being equal to the multiplication product of the measured current and the measured electrolyte resistance; and that which will cause the multiplication product of the measured sheet resistance and the measured current to be less than the predetermined maximum sheet IR drop.

28. The method of claim 27, further comprising the steps of:

measuring the temperature of the mirror; and adjusting the second positive voltage to account for the temperature dependence of the electrolyte resistance and the temperature dependence of the mirror electrode sheet resistance.

* * * * *